No. 708,482. Patented Sept. 2, 1902.
T. B. JEFFERY.
PNEUMATIC TIRE.
(Application filed July 24, 1901.)
(No Model.)
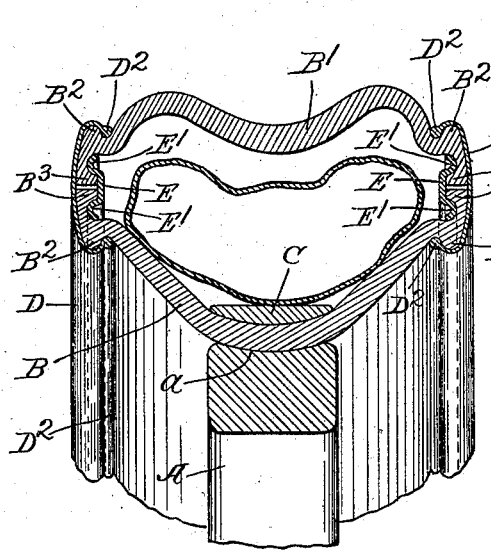
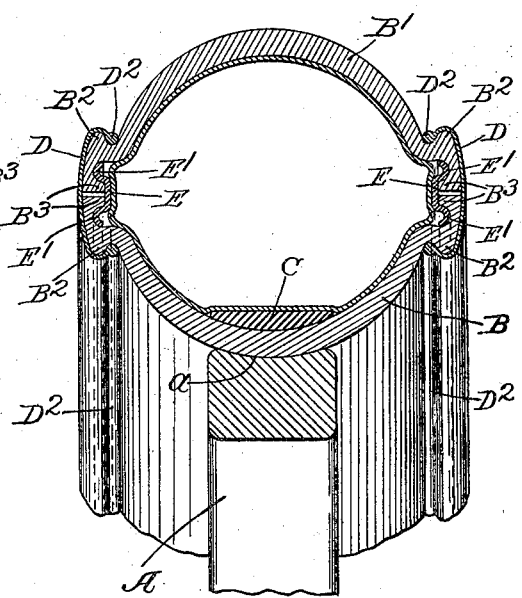
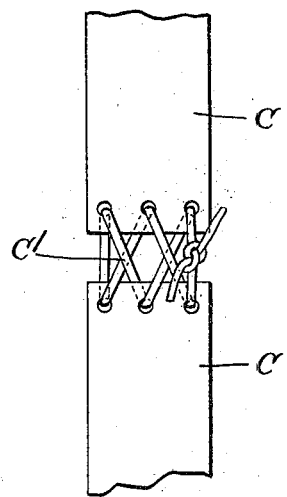
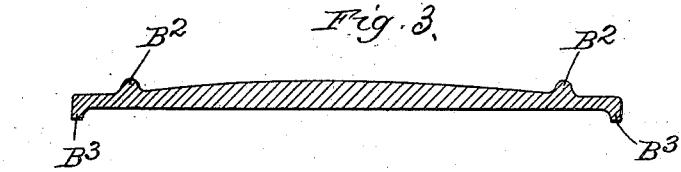
Witnesses,
Edward T. Wray.
Adna H. Bowen, Jr.
Inventor,
Thos. B. Jeffery
by Burton & Burton
his Atty's.

UNITED STATES PATENT OFFICE.

THOMAS B. JEFFERY, OF KENOSHA, WISCONSIN.

PNEUMATIC TIRE.

SPECIFICATION forming part of Letters Patent No. 708,482, dated September 2, 1902.

Application filed July 24, 1901. Serial No. 69,471. (No model.)

*To all whom it may concern:*

Be it known that I, THOMAS B. JEFFERY, a citizen of the United States, residing at Kenosha, in the county of Kenosha and State of Wisconsin, have invented certain new and useful Improvements in Pneumatic Tires, of which the following is a specification, reference being had to the accompanying drawings, forming a part thereof.

The purpose of this invention is to provide a pneumatic tire for vehicle-wheels which shall to a greater extent than any hitherto in use be free from the liability to deterioration by what may be called "internal wear" or the tendency of the alternate contraction and expansion, bending, and flattening to break down the structure of the fabric.

The features of construction which constitute this invention are set out in the claims.

Figure 1 is a transverse section of a wheel-rim and pneumatic tire involving my improvements, the tire being shown inflated. Fig. 2 is a similar section, showing the tire flat or uninflated. Fig. 3 is a transverse section of one of the bands of the tire of the form shown in Fig. 1 as it appears before it is assembled with the other parts to form the tire. Fig. 4 is a detail view of the strap-fastening.

A is the rim of a vehicle-wheel. Its outer periphery may be slightly hollowed, as seen at $a$.

B B' in Figs. 1 and 2 and $b$ $b'$ in Fig. 3 are two concentric flexible bands, which, with the means for securing them together, constitute the tire. They are shown and may be constructed identical in cross-section, and while in the particular form shown in Figs. 1 and 2 it may be necessary to have the outer one, B', slightly larger—that is, greater in circumference—than the inner one, B, this is not necessary in the other forms illustrated, except in the case of heavy tires in which the thickness of these elements is considerable, so that the outer one needs to be of greater diameter than the inner in order to pass outside of it without too much stretching of the outer or compressing of the inner one. These bands may be substantially flat transversely as originally constructed—that is, before being assembled in the tire and before the inflation of the tire. Fig. 4 shows a form in this respect of the bands of Figs. 1 and 2. One of the bands is seated at the middle part of its width on the periphery of the rim A and secured thereto in any desirable manner. The most convenient and secure method of fastening it is to employ an outer strap or band C, which may be a continuous or closed ring of suitable diameter to be forced tightly to the position shown in Fig. 1, encompassing the inner element of the tire and fitting tightly enough when thus forced on to hold the tire stretched; but it may be an open ring having provision for connecting its ends together and drawing it up tightly, as by lacing, as seen at C'.

I do not limit myself to any particular mode of securing the inner element of the tire on the rim, but prefer the encompassing band C, and when such band is used I do not limit myself to any particular mode of rendering it tight enough to hold the tire in place.

The two elements B and B' or $b$ $b'$ of the tire may be made of textile fabric and rubber after the customary mode of constructing outer casings of pneumatic tires now in use, or it may be of such material as leather or other material having sufficient tenacity, flexibility, and elastic extensibility to operate in the manner required, as indicated by the drawings, for it will be understood that when the two elements are secured together, so as to inclose the cavity which is to be inflated or is to be occupied by an inflated tube, the lateral edges of the inner element B or $b$ will necessarily have a larger circumference than the middle point, which is clamped on the rim, and the middle part of the outer element will be stretched to a still larger circumference than its lateral edges, and the material employed must be such as to permit such extension under inflation or must be sufficiently flexible so that the inner element B may be mounted on the rim with some fullness at its seat thereon and that the outer element B' may have its lateral edges joined to the lateral edges of the inner element with some fullness, corresponding to the difference in circumference at the middle and edges of said elements, respectively. The requirement of flexibility, however, may be reduced by molding the two parts approximating the form that they will take when inflated, so that the inner part shall have less circumference where it is seated on the rim than at the lateral edges and the outer part shall have greater circumference at the middle than at the lateral edges. The preferable construction, however, is to make both elements B and B' substantially flat crosswise and rely upon the flexibility and elastic extensibility for accommodation to the form produced in the process of joining the parts together and by inflation.

The two elements B and B' or $b$ and $b'$ are joined at their lateral edges in any secure manner. The simplest mode of securing them together is that shown with respect to the forms $b$ and $b'$ in Fig. 3, in which they are simply stitched together face to face, three lines of stitching $d$ $d$ $d$ being shown. Rivets may be employed instead of stitching, if preferred. For some purposes, however, it is preferable to provide some method for securing these elements together at their lateral edges which shall permit them to be more readily taken apart, and it is also desirable for some purposes that the means of securing them together should be rigid or comparatively rigid and of material adapted to endure frictional wear, to which the side of a tire is liable to be exposed in some situations, as when a wheel is running in a flanged car-track or against a curb. I have therefore shown as a somewhat preferred form of construction in Figs. 1 and 2 rigid annular clasps D D, clasping and binding together the corresponding lateral edges of the elements B and B'. In order to enable the clasps D D to securely hold the elements B and B,' the latter are preferably provided with beads or ribs $B^2$ $B^2$, parallel with their lateral edges on the outer surface, and the clasps D D are inturned at their edges, forming hooks $D^2$, which engage these beads. To complete and fortify the means of securing the parts together, I provide an interior clenching element, which in the form shown in Figs. 1 and 2 is also a rigid annular element E, suitably formed with ribs or beads E' E' at its edges to engage behind ribs or beads $B^3$ $B^3$, which project from the inner surfaces of the elements B B' at the lateral edges of said elements, respectively. When inflation occurs it will be seen that the marginal portions of the elements B and B' will be clamped between the two elements D and E by the interior pressure of inflation and that the same interior pressure will cause the elements B and B' to be forced tightly against the edges or lips of the hooks $D^2$ $D^2$ of the clasps D. One purpose of the form and arrangement of these fastening or binding devices which secure the lateral edges of the tire elements B and B' together is to distribute as widely as possible the strain which the inflation of the tire (which is sometimes carried to as high a degree as one hundred and fifty pounds to the square inch) tends to impose upon the fabric, particularly at the point at which it is bound. It may be understood that if the element B' were pinched tightly between two rigid ribs at any particular line the strain of inflation might tend to cut or tear the fabric at that line or, at least, to very rapidly deteriorate it along that line by reason of the bending back and forth as the tire was flattened and expanded in the process of rolling over the pavement; but by the arrangement shown, consisting of the interior and exterior ribs and beads $B^2$ and $B^3$, separated quite a little distance from each other, and the lips of the hooks of the exterior and interior clasping devices D and E, engaging said ribs at a like distance apart, the strain of inflation is distributed over the entire area of the marginal portion of the elements B and B', commencing with the point at which the lips $D^2$ of the marginal hooks of the clasp D bear on the outer surface to the inner rib $B^3$, which is at the very edge of the tire element. With this construction the danger of rupture due to the strain imposed by the inflation is reduced practically to a minimum.

I claim—

1. A pneumatic tire comprising concentric flexible bands adapted when secured together at their lateral edges to constitute an inclosure, in combination with rigid annular elements which lap and unite such flexible bands at their corresponding lateral edges, such rigid annular elements being exterior to the edges which they unite, and forming rigid lateral armor for the tire.

2. A pneumatic tire comprising a casing consisting of two flexible elements each annular and adapted to be joined at their corresponding lateral edges to inclose the tire-chamber; two rigid annular elements lapping the adjacent edges of the flexible elements at the opposite sides respectively of the tire and connected thereto and constituting the means of uniting said two flexible elements.

3. A pneumatic tire consisting of two concentric flexible bands having their corresponding lateral edges in the same planes respectively transverse to the axis, in combination with two rigid annular elements which lap and engage the corresponding edges of the flexible bands at opposite sides respectively.

4. A pneumatic tire consisting of two concentric flexible bands which are normally approximately semicylindrical in form in transverse section, in combination with two rigid annular elements which lap and engage the corresponding edges of the flexible bands at opposite sides respectively.

5. A pneumatic tire, consisting of two concentric flexible bands, of which the inner is adapted to be seated at the middle part of its width on the rim, and means securing it thereto; said bands being united throughout their circumference at their corresponding lateral edges; interior annular elements lapping the two bands across their said lateral junctions, and engaged with the bands at opposite sides of the junctions respectively.

6. A pneumatic tire, consisting of two concentric bands; rigid annular elements which exteriorly clasp their corresponding lateral edges, and rigid annular elements which interiorly lap the edges of said bands at each of said lateral junctions, and engage the bands at opposite sides of said junctions respectively.

7. A pneumatic tire, consisting of two concentric annular bands, each provided with exterior and interior beads, $B^2$, $B^3$, parallel with their lateral edges respectively, the interior beads being nearer the edge than the exterior; in combination with the rigid annular elements adapted to clasp the corresponding edges of said bands and engage the exterior beads thereof; and interior rigid annular elements lapping the junctions of said bands at the opposite sides, and engaging their interior beads.

In testimony whereof I have hereunto set my hand, at Chicago, Illinois, in the presence of two witnesses, this 19th day of July, A. D. 1901.

THOS. B. JEFFERY.

In presence of—
  CHARLES T. JEFFERY,
  L. B. SAWINSKY.